Figure 1:
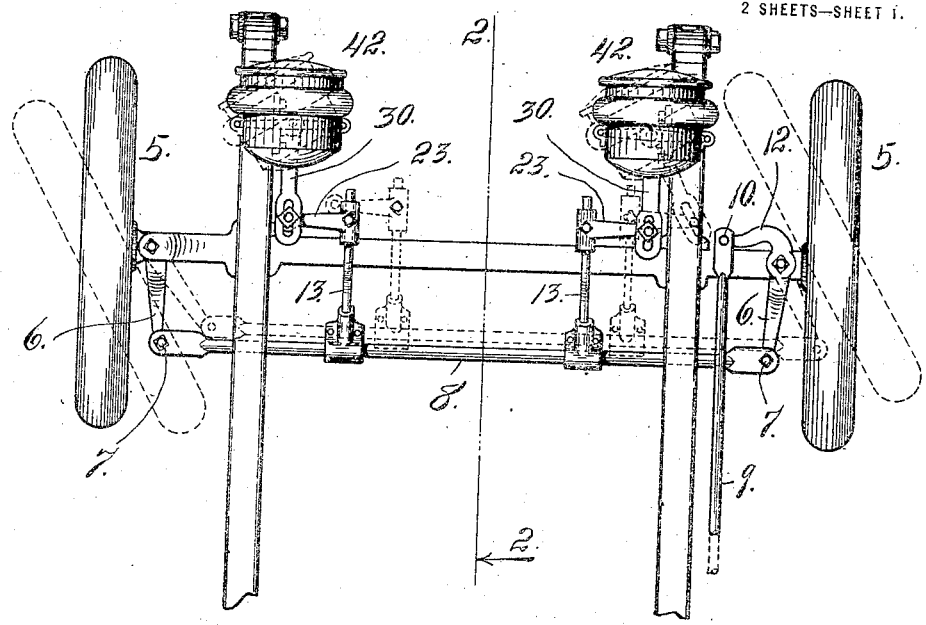

J. N. BRADLEY.
DIRIGIBLE HEADLIGHT FOR AUTOMOBILES.
APPLICATION FILED APR. 17, 1915.

1,163,315.

Patented Dec. 7, 1915.
2 SHEETS—SHEET 1.

Witnesses
Otto E. Hoddick
John B. Cade

Inventor
James N. Bradley
By
Attorney

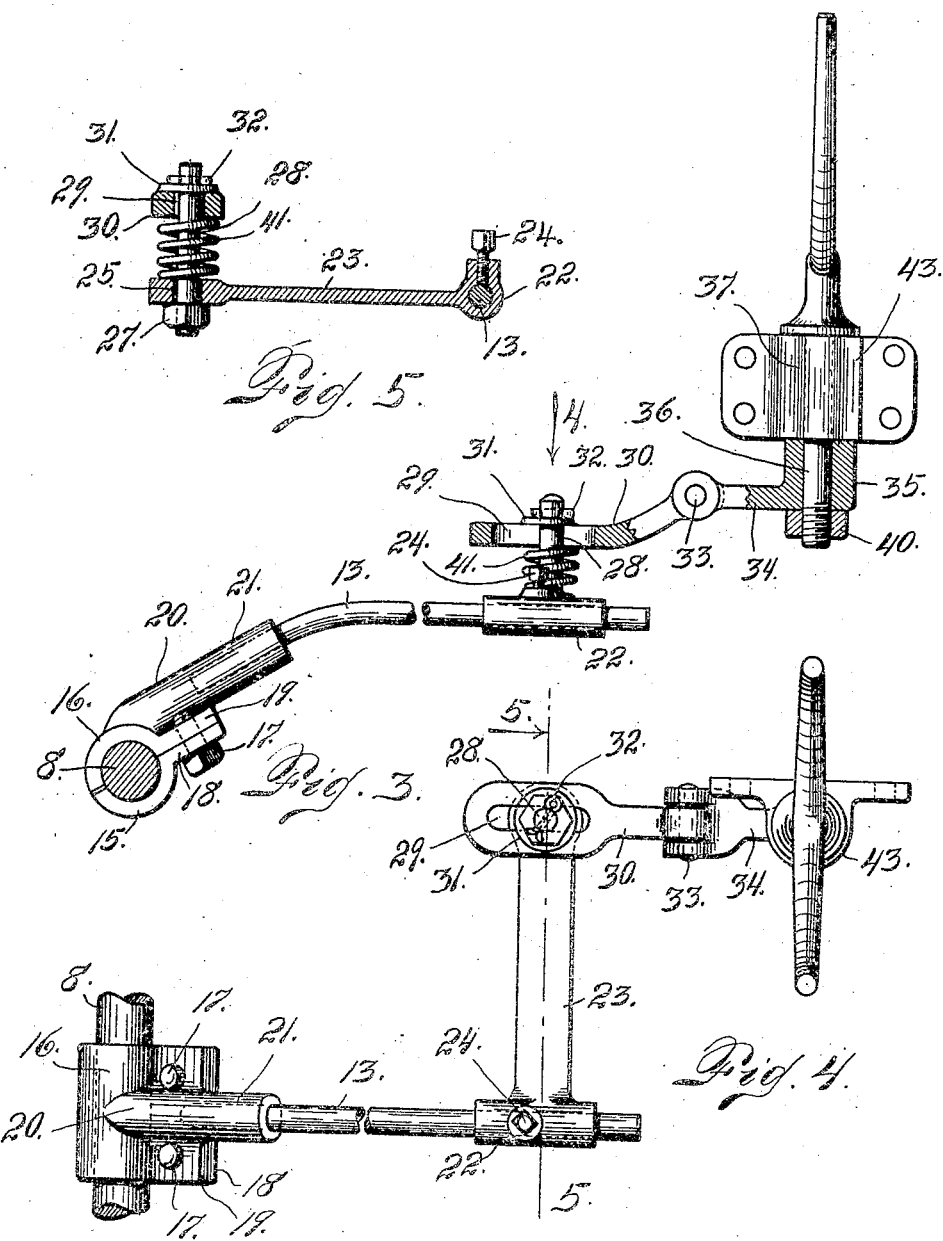

UNITED STATES PATENT OFFICE.

JAMES N. BRADLEY, OF DENVER, COLORADO.

DIRIGIBLE HEADLIGHT FOR AUTOMOBILES.

1,163,315.          Specification of Letters Patent.     Patented Dec. 7, 1915.

Application filed April 17, 1915. Serial No. 21,972.

*To all whom it may concern:*

Be it known that I, JAMES N. BRADLEY, a citizen of the United States, residing at the city and county of Denver and State of Colorado, have invented certain new and useful Improvements in Dirigible Headlights for Automobiles; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in dirigible headlights for automobiles, my object being to provide a construction of this character which shall make it easy for the chauffeur or person in charge of the machine to shift or change the position of the headlight on turns, to correspond with the direction of the road, whereby the illumination from the lamps shall at all times be directly in front of the machine. Where no provision is made for a function of this character, it is well known that the light from the lamps on turns is thrown outside of the road, and beyond the track upon which the machine is traveling, thus making it impossible for the chauffeur to discern obstacles which may be in the road and on the turn, and consequently, the road, when the light is in such a position, cannot be illuminated. Furthermore, in constructions where the ordinary lamps are used, the light after making a turn, is not again thrown upon the road in front of the machine until the latter is headed in a straight direction.

The object of my invention is to overcome this difficulty and to this end, I employ means connected with the transverse rod which is employed to connect the stub axles of the front wheels, whereby the two wheels are caused to turn simultaneously for steering purposes.

In my improvement, the lamp bracket is pivotally mounted on a member secured to the forward extremity of the chassis of the machine, the pivoted part being continued downwardly and connected with a crank arm, with which it is made to turn. To the opposite extremity of this arm is hinged a link, which in turn is connected with an auxiliary arm rigidly secured to an arm, which is itself clamped to the rod connecting the stub axle cranks of the front wheels. As this rod is shifted during the steering operation, a rotary movement on the axes of the lamps is imparted to the latter in harmony with the turning movement of the machine, whereby the light is continuously kept upon the track or road in front of the machine.

Having briefly outlined my improved construction, as well as the function it is intended to perform, I will proceed to describe the same in detail, reference being made to the accompanying drawings in which is illustrated an embodiment thereof.

Figure 2:
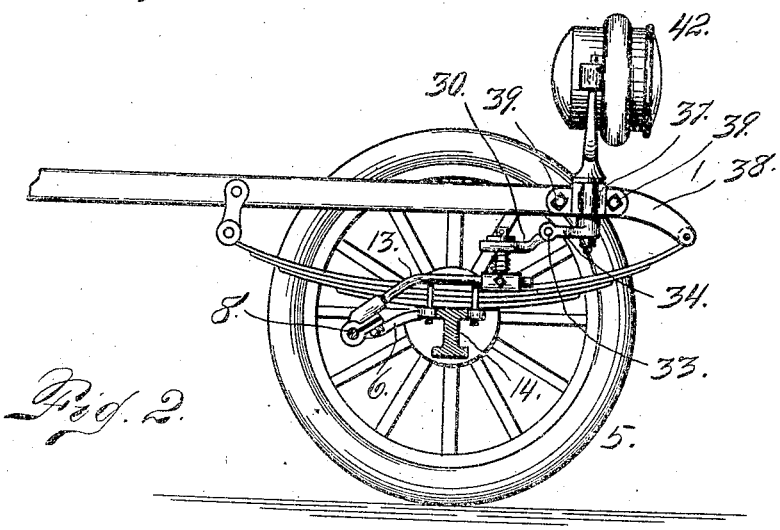

In this drawing, Figure 1 is a top plan view of the front part of the chassis of an automobile, the same being equipped with my improvement, the parts shown in two positions, namely, in a full line position and a dotted line position. Fig. 2 is a view taken on the line 2—2, Fig. 1, looking toward the left. Fig. 3 is a side view partly in elevation and partly in section of my improvement, the same being shown on a larger scale than in Figs. 1 and 2, the transverse rod of the steering mechanism being sectioned. Fig. 4 is a top plan view of the same. Fig. 5 is a section taken on the line 5—5, Fig. 4, looking toward the right.

The same reference characters indicate the same parts in all the views.

Let the numeral 5 designate the front wheels of an automobile, to the stub axles of which are made fast crank arms 6, whose outer extremities are pivotally connected, as shown at 7, with a transverse rod 8, which is actuated through the medium of a steering rod 9, the latter being pivotally connected as shown at 10, with a crank arm 12, which connects with one of the stub axles in the usual manner.

To the transverse rod 8 is clamped two arms 13, which extend upwardly above the front axle 14 of the machine. These arms may be adjusted longitudinally of the rod 8, thus making it possible to attach the apparatus to machines of varying construction. This attachment is made by means of a clamp composed of a lower member 15 and an upper member 16, these two members coöperating to form a cavity which is adapted to receive the rod 8, the same being clamped thereto by means of bolts or cap screws 17, which are passed through registering openings formed in coöperating and abutting flanges 18 and 19. The members 16 of this clamp is also provided with an integral sleeve 20, in which a socket 21 is formed, adapted to receive the rear extremity of the arm 13 to which the said arm is secured in any suitable manner. The forward extremity of this arm 13 passes through a sleeve 22 formed at one extremity of an arm 23 which extends at right angles to the portion of the rod upon which the sleeve is mounted. As illustrated in the drawing, this sleeve is secured to the rod by means of a set bolt 24, whereby the arm is adjustable upon the sleeve in assembling the parts, thus giving the mechanism a relatively large degree of adaptability to automobiles of varying construction.

The extremity of the arm 23 remote from the arm 13 is perforated as shown at 25, to receive a bolt 26 to whose lower extremity is applied a nut 27. This bolt has a shank 28 which extends above the arm 23 and passes through a slot 29 formed in a link 30, the bolt being connected with the link by means of a washer 31 and a split cotter pin 32. The forward extremity of this link is hinged as shown at 33, to an arm 34, whose extremity remote from the link terminates in an upwardly projecting sleeve 35 through which passes a depending stem 36 belonging to the lamp bracket 43 and which is journaled in a box 37 made fast to a bar 38 of the chassis by means of suitable fastening devices 39. The stem 36 of the lamp bracket is secured to the arm 34 by means of a nut 40, the said stem being caused to rotate with the sleeve 35, as the proper movement is imparted to the arm 34. Between the slotted extremity of the link 30 and the adjacent extremity of the arm 23, is located a spiral spring 41 which surrounds the shank 28 of the bolt 26. This spring compensates for the necessary vibration or upward and downward movement of the chassis, without disturbing the arms 13.

From the foregoing description, the use and operation of my improved dirigible headlight construction will be readily understood. Assuming that the said construction is installed upon a machine as illustrated in Figs. 1 and 2, if we assume that the chauffeur operates the steering mechanism to throw the front wheels 5 to the position indicated by the dotted lines in Fig. 1, the transverse rod 8 will be shifted in a direction parallel with the front axle 14 of the machine, resulting in imparting a corresponding movement to the arms 13 and 23, whereby the link 30 and the arm 34 are actuated sufficiently to impart a partial rotation to the lamps 42, which are mounted upon brackets 43. This movement of the lamps is indicated by the dotted lines and is such as to throw the light upon the road directly in front of the machine during the turning operation, as will be readily understood.

The hinged connection between the arm 34 and the link 30, further compensates for the vertical vibration of the body of the machine without in any way disturbing the proper operation of the dirigible mechanism. These elements 30 and 34 virtually constitute a crank arm, one extremity of which is rigidly connected with the pivoted stem of the corresponding lamp bracket, while the other extremity is pivotally connected with the auxiliary arm which moves with the main arm 13 by virtue of a rigid connection between the auxiliary and main arms. It should be understood however, that the auxiliary arm is longitudinally adjustable on the main arm by virtue of the construction whereby the set bolt 24 connects the sleeve 22 with the main arm 13. It is evident that by loosening this set bolt, the sleeve may be adjusted longitudinally on the arm 13. Hence the construction is adaptable to varying constructions of machines, so far as details are concerned.

Having thus described my invention, what I claim is,—

1. The combination with the steering mechanism of an automobile, of headlights pivotally mounted on the chassis, means connecting the transverse rod of the steering mechanism with the lamps for turning the latter to correspond with the turning movement of the machine, said means comprising main arms mounted on the rod, auxiliary arms connected with the main arms and extending at right angles thereto, crank arms pivotally connected at one extremity with the auxiliary arms and pivotally connected at their opposite extremities with the lamps, and vertically yielding springs located between the auxiliary arms and the crank arms.

2. The combination with headlights pivotally mounted on the chassis of an automobile, of means connecting the transverse rod of the steering mechanism of the machine with the lamps for turning the latter to correspond with the turning movement of the machine, said means comprising main arms mounted on the said rod, auxiliary arms rigidly connected with the main arms, and crank arms located between the auxiliary arms and the lamps, the crank arms being pivotally connected with the auxiliary arms by means of bolts which are fitted in one set of arms and passed through slots formed in the other set of arms whereby a limited degree of adjustment is obtained between the two sets of arms, the opposite extremities of the crank arms being connected with the lamps for the purpose set forth.

3. The combination with headlights pivotally mounted on the chassis of an automobile, of means connecting the transverse rod of the steering mechanism with the lamps for turning the latter to correspond with the turning movement of the machine, said means comprising main arms mounted on the said rod, auxiliary arms rigidly connected with the main arms and extending at an angle thereto, and crank arms located between the auxiliary arms and the lamps, bolts pivotally connecting the auxiliary arms with the crank arms, one set of arms being slotted to receive said bolts, the crank arms and auxiliary arms being spaced on the bolt, spiral springs surrounding the bolts and located between the auxiliary arms and the crank arms, the opposite extremities of the crank arms being connected with the lamps, for the purpose set forth.

4. The combination with the steering mechanism of an automobile, including the usual transverse rod, of pivoted lamp brackets, crank arms connected at one extremity with said brackets, auxiliary arms pivotally connected with the crank arms, one set of said connected arms being slotted, springs located between the auxiliary arms and crank arms, main arms rigidly mounted on the transverse rod at one extremity, while their opposite extremities are rigidly and adjustably connected with the auxiliary arms, substantially as described.

5. The combination with the steering mechanism of an automobile, including the usual transverse connecting rod, and lamp brackets pivotally mounted on the chassis of the machine, of main arms rigidly and adjustably connected with the said steering rod, auxiliary arms rigidly and adjustably connected with the main arms, crank arms located between the lamp brackets and auxiliary arms, bolts pivotally connecting the auxiliary arms with the crank arms, one set of arms being slotted to receive the said bolts, spiral springs surrounding the bolts and located between the auxiliary arms and crank arms, the opposite extremities of the crank arms being pivotally connected with the lamp brackets, the crank arms being vertically flexible, substantially as described.

In testimony whereof I affix my signature in presence of two witnesses.

JAMES N. BRADLEY.

Witnesses:
 MAZE KIRBY,
 A. EBERT O'BRIEN.